(12) United States Patent
Yoshida et al.

(10) Patent No.: US 6,674,265 B2
(45) Date of Patent: Jan. 6, 2004

(54) OPERATION METHOD FOR SECONDARY BATTERY AND SECONDARY BATTERY DEVICE

(75) Inventors: Hiroaki Yoshida, Kyoto (JP); Masanao Terasaki, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 77 days.

(21) Appl. No.: 10/106,047

(22) Filed: Mar. 27, 2002

(65) Prior Publication Data
US 2003/0052647 A1 Mar. 20, 2003

(30) Foreign Application Priority Data

Mar. 28, 2001 (JP) ........................................ 2001-091921
Feb. 26, 2002 (JP) ........................................ 2002-050012

(51) Int. Cl.$^7$ ............................................... H01M 10/44
(52) U.S. Cl. ....................................................... 320/125
(58) Field of Search ................................ 320/106, 110, 320/125, 137, 160, 162, 164

(56) References Cited

U.S. PATENT DOCUMENTS 5,896,024 A * 4/1999 Bradus et al.
5,949,216 A * 9/1999 Miller

FOREIGN PATENT DOCUMENTS

| JP | 11-004549 | 1/1999 |
| JP | 2000-023388 | 1/2000 |
| JP | 2000-133321 | 5/2000 |

* cited by examiner

Primary Examiner—Edward H. Tso
(74) Attorney, Agent, or Firm—Wenderoth, Lind & Ponack, L.L.P.

(57) ABSTRACT

For charging a secondary battery, at least two operation modes including first and second operation modes, in which the secondary battery is charged to predetermined charge end voltages different from each other, are established. Both life and capacity of the battery can be maximized by a user selecting either of the two operation modes, or switching between the two operation modes automatically with a timer device, or according to a temperature of the battery, state of health thereof, or internal pressure thereof.

21 Claims, 11 Drawing Sheets

FIG. 6

| HIGH CAPACITY MODE | | | | | LONG LIFE MODE | | HIGH CAPACITY MODE | |
|---|---|---|---|---|---|---|---|---|
| MON. | TUE. | WED. | THURS. | FRI. | SAT. | SUN. | MON. | TUE. | form
OPERATION METHOD FOR SECONDARY BATTERY AND SECONDARY BATTERY DEVICE

FIELD OF THE INVENTION

The present invention relates to an operation method for a secondary battery that is repeatedly charged and discharged for use and a secondary battery device.

DESCRIPTION OF THE PRIOR ART

For example, a secondary battery device mounted on an electric vehicle provides energy for the vehicle to travel by charging a secondary battery with a charger to a predetermined charge end voltage and then discharging the battery as required. Besides, in order to keep a temperature of the secondary battery within a certain range in an environment of low or high temperature, a temperature controller having a cooling fan or heater is typically provided in the secondary battery device.

Charge control by the charger in such a secondary battery device is carried out in the following manner. That is, in the case of a lithium secondary battery, for example, constant current charge is first conducted with a constant current, constant voltage charge is then conducted for a predetermined time with a charge end voltage of, for example, 4.2 V, and thereby the secondary battery is charged to 100% of a quantity of charged electricity.

By the way, for leveling the electric power demand, some office buildings are equipped with a secondary battery device for storing a midnight electric power, for example. This secondary battery device comprises a secondary battery, a charger for charging the secondary battery with the midnight electric power, and an inverter for generating an alternating current power in the daytime from a DC power stored in the secondary battery.

Charge control by the charger in such a secondary battery device for load-leveling is carried out in the following manner. That is, in the case of a lithium secondary battery, for example, when the time period of the midnight electric power comes round, constant current charge is first conducted with a constant current, and upon attaining a predetermined voltage, the charge scheme is shifted to constant voltage charge, which is conducted for a predetermined time.

Such a secondary battery has a disadvantage that raising the charge end voltage to enhance a charging rate promotes degradation of the battery, resulting in a reduced life thereof. This problem has been pointed out in Japanese Patent Laid-Open No. 11-4549, in which extension of the battery life is attempted by stopping charge before the secondary battery is fully charged to suppress the quantity of charged electricity.

While the battery life can be extended by suppressing the quantity of charged electricity as described in the above Japanese Patent Laid-Open No. 11-4549, however, the reduced quantity of charged electricity poses another problem of a reduced utilization factor of the secondary battery. Thus, the secondary battery cannot be fully used; for example, a driving range of the electric vehicle may be reduced. Although such a circumstance is preferable for a user placing prime importance on the battery life, it is not preferable for a user placing prime importance on the capacity rather than the life thereof. Furthermore, in the case of the secondary battery device for load-leveling, since the required capacity of the secondary battery is predetermined in the design stage depending on a maximum power consumption by load, if the utilization factor of the secondary battery is reduced, the number of secondary batteries provided has to be increased accordingly, and therefore, the cost of equipment will be increased.

The present invention is devised in view of the above described circumstances, and a first object of this invention is to provide an operation method for a secondary battery and a secondary battery device that allow a user to decide which is to be given a priority, the life of the secondary battery or capacity thereof. In addition, a second object of this invention is to provide an operation method for a secondary battery and a secondary battery device that can provide an extended life of the secondary battery and an enhanced utilization factor thereof.

SUMMARY OF THE INVENTION

According to a first aspect of this invention, in a charge operation of a secondary battery, at least two operation modes including first and second operation modes in which the secondary battery is charged to predetermined charge end voltages different from each other are established, and either of the two operation modes can be selected according to a control signal from the outside of the secondary battery. In an operation mode with high charge end voltage, high battery capacity is provided, so that it is suitable for a case where a user wishes to travel a long distance by an electric vehicle, for example. On the other hand, in an operation mode with low charge end voltage, although the battery capacity is reduced, the life of the battery is extended, so that the running cost thereof is advantageously reduced. The user can select either of the modes arbitrarily.

In the case of a secondary battery device for load-leveling installed in an office building, for example, while power consumption by load is high on weekdays due to the operation of office automation appliances and an air conditioning system in the building, the power consumption by load is low on a holiday due to the significantly reduced rate of operation thereof. In this way, in a significant number of cases, the power consumption by load of the secondary battery device varies in a predetermined pattern. In such a secondary battery device, there should be no problem if the quantity of charged electricity of the secondary battery is suppressed before the load is reduced.

Thus, according to a second aspect of this invention, a timer device switches the operation mode between the first operation mode and the second operation mode that are different in charge end voltage. By the timer device establishing the first operation mode with high charge end voltage when the power consumption by load is high and the second operation mode with low charge end voltage when the power consumption by load is low, degradation of the secondary battery can be minimized while assuring a required quantity of electric power.

Alternatively, the first and second operation modes may be switched to each other according to the battery temperature. When the battery temperature is higher than a predetermined value, the battery is charged in the second operation mode with low charge end voltage. This is because when the battery temperature is high, the impedance of the battery is reduced and the quantity of charged electricity tends to increase, and the battery tends to be readily degraded, and therefore, it is desired that the life of the battery is extended by lowering the charge end voltage. Here, the battery temperature may be measured with a temperature sensor attached to a battery case, or a temperature of the air surrounding the installed battery may be measured and regarded as the battery temperature.

Alternatively, the first and second operation modes may be switched to each other according to a state of health (SOH) of the battery. When the state of health of the battery is equal to or higher than a predetermined value, the battery is charged in the second operation mode with low charge end voltage, and when the state of health is equal to or lower than the predetermined value, the battery is charged in the first operation mode with high charge end voltage. When the state of health of the battery is high, the capacity of the battery is high and the internal resistance thereof is low, so that operation with low charge end voltage is possible, and thus, degradation of the battery is hard to advance. When the state of health of the battery is reduced, increasing the charge end voltage enables an extended period of use of the battery. Here, the state of health of the battery can be determined based on a voltage drop value and the battery temperature during discharge of the battery.

Alternatively, in the case of a sealed battery, since as degradation of the battery advances, the pressure in the battery is increased, the internal pressure of the battery may be measured, and the modes of the battery may be switched to each other according to the internal pressure. In this case, if degradation of the battery does not advance, and the internal pressure is low, degradation of the battery can be suppressed by operation with low charge end voltage. When the internal pressure is increased due to degradation of the battery, increasing the charge end voltage enables an extended period of use of the battery. Here, the internal pressure of the battery can be measured with a pressure sensor arranged in the battery, or a strain gage attached to a surface of the battery case.

In the case where a battery temperature controlling device for controlling the battery temperature and the sensor for detecting the state of the battery are provided, and the battery is charged in the first operation mode with high charge end voltage, it is desired that the temperature of the secondary battery during charge and discharge is higher than that in the second operation mode. This is because the higher temperature allows the stored energy to be released more efficiently and a larger service capacity to be assured. When a state of charge of the battery is high, it is desired that the operating temperature of the battery is low. This is because while the battery tends to readily be degraded when the state of charge of the battery is high, lowering the operating temperature enables the degradation to be suppressed. In addition, when a discharge current of the battery equal to or lower than a predetermined value is detected, it is desired that the operating temperature of the battery is low. This is because when the load current is low, a low operating temperature is sufficient for operation, as well as can lead to suppression of the degradation of the battery.

BRIEF DESCRIPTION OF THE DRAWINGS

FIG. 6 is a time chart showing an operation pattern of a battery according to the fourth embodiment of this invention;

DESCRIPTION OF THE PREFERRED EMBODIMENTS

First Embodiment

Figure 1:
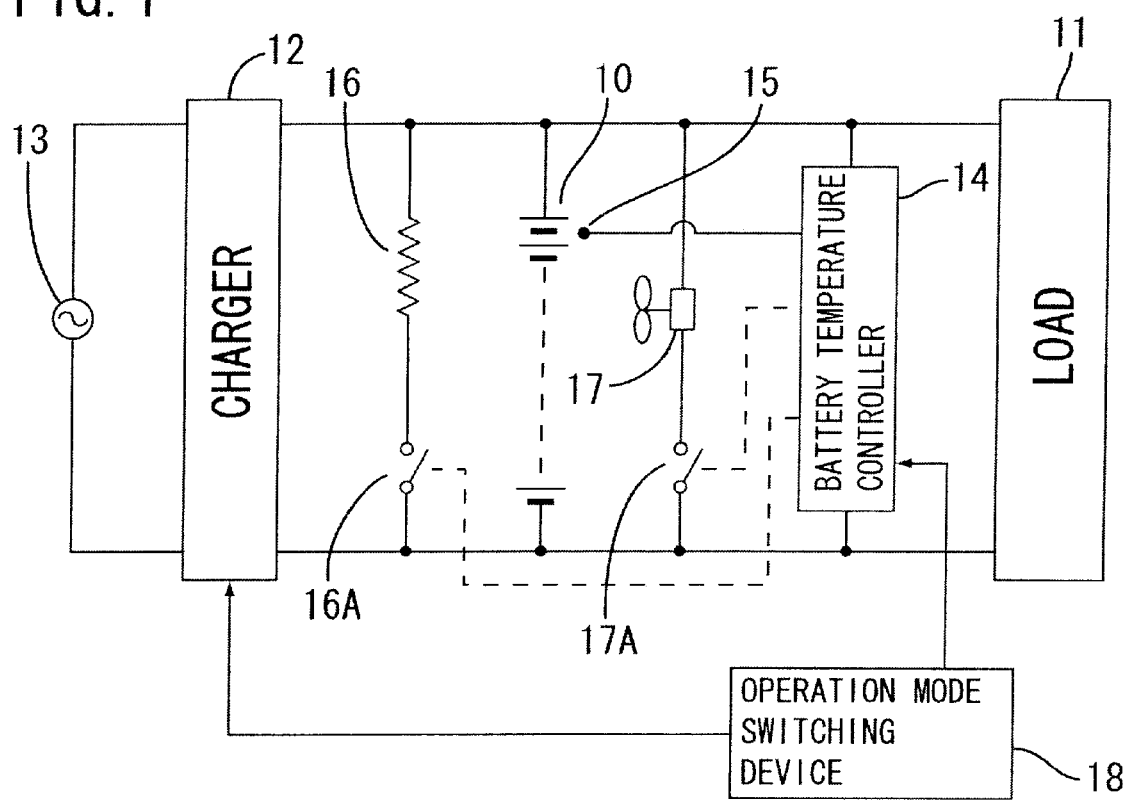
FIG. 1 is a block diagram showing a first embodiment of this invention.
Figure 2:
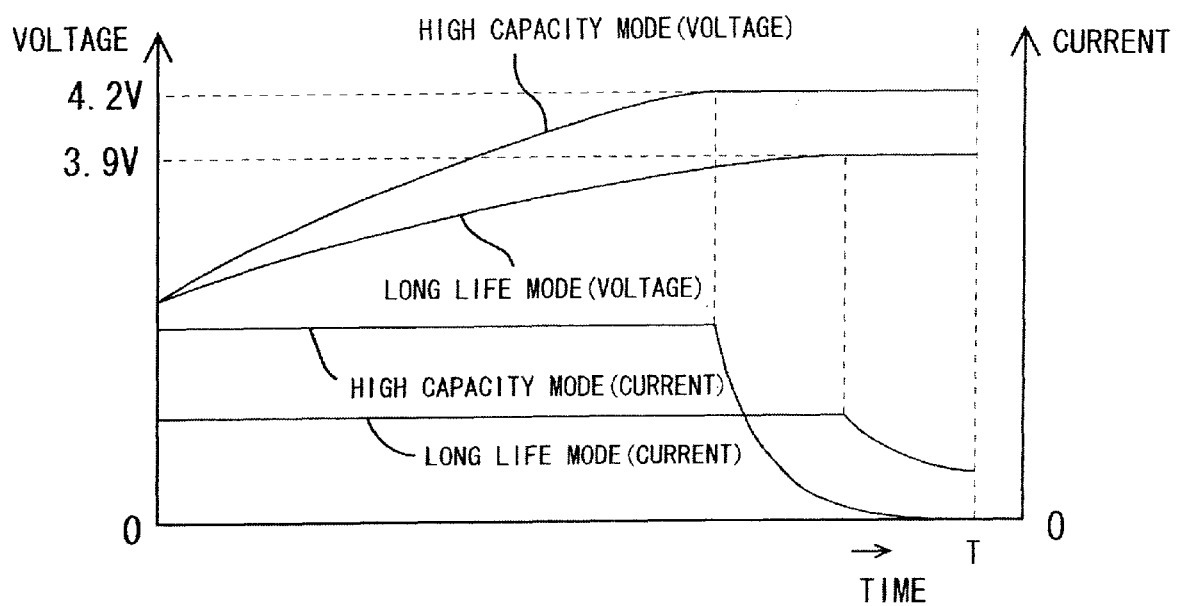
FIG. 2 is a graph showing variations in a voltage and a current for a high capacity mode and a long life mode.

Now, a first embodiment of this invention applied to an electric vehicle will be described with reference to FIGS. 1 and 2.

Reference numeral 10 denotes a lithium secondary battery, which supplies a DC power to a load 11 composed of an inverter and the like for driving an electric vehicle. A charger 12 is connected to the secondary battery 10, and thus the secondary battery 10 can be charged with an alternating current power supplied from a commercial power supply 13. An example of a charge pattern is shown in FIG. 2, in which upon beginning of charge, the battery is charged with a predetermined constant current to a predetermined charge end voltage, and then constant voltage charge with the charge end voltage is conducted until a predetermined time T, which is the total charge time, is reached. There are two operation modes of a high capacity mode and a long life mode described later, the charge end voltage for the high capacity mode being set higher than that for the long life mode.

Reference numeral 14 denotes a temperature controller, which has a function of controlling an operating temperature of the secondary battery 10 based on a signal received from a temperature sensor 15 provided in the secondary battery 10. Specifically, the temperature controller has a heater 16 and a cooling fan 17 attached to the secondary battery 10. When the temperature of the secondary battery 10 detected by the temperature sensor 15 is lower than a predetermined reference temperature, the temperature controller closes a switch 16A to energize the heater 16, thereby heating the secondary battery 10, and when the temperature of the secondary battery 10 is higher than the predetermined reference temperature, it closes a switch 17A to drive the cooling fan 17, thereby cooling the secondary battery 10 with the outside air.

Reference numeral 18 denotes operation mode setting means, which comprises a mode switch (not shown) provided on an instrument panel of the electric vehicle, for example, and can selectively switch between the high capacity mode and the long life mode by manipulating the switch. The high capacity mode corresponds to a "first operation mode" referred to herein, and the long life mode corresponds to a "second operation mode" referred to herein.

When the operation mode setting means 18 sets either of the modes, a signal is transmitted to the charger 12 and the temperature controller 14 according to the mode. For example, in the high capacity mode, the charger 12 has a charge current of 20A during the constant current charge and a charge end voltage of 4.2 V, and in the long life mode, it has a charge current of 10A during the constant current charge and a charge end voltage 3.9 V. That is, the charge end voltage is higher in the high capacity mode than in the long life mode, and the charge current during the constant current charge is larger in the high capacity mode than in the long life mode. Furthermore, according to this embodiment, an average operating temperature of the secondary battery 10 (during charge and discharge) controlled by the temperature controller 14 is set to fall within the range of 35° C.±20° C. in the high capacity mode, and is set to fall within the range of 15° C.±20° C. in the long life mode.

According to this embodiment, when the high capacity mode is set by the mode switch, the charge end voltage of the secondary battery 10 during charge is set at the higher value of 4.2 V, and the average temperature thereof during operation is set to fall within the range of 35° C.±20° C., so that a fresh battery is charged to a level of substantially 100% of a rated capacity thereof. When the lithium secondary battery 10 having a capacity of 100 Ah is used, the vehicle can travel about 150 km at the maximum. On the other hand, when the mode is switched to the long life mode by the mode switch, the charge end voltage of the secondary battery 10 during charge is set at the lower value of 3.9 V, and the average temperature thereof during operation is set to fall within the range of 15° C.±20° C. Accordingly, a fresh battery is charged to a level of substantially 60% of a rated capacity thereof, and thus a maximum driving range results in about 90 km, which is shorter than that for the high capacity mode. However, since the secondary battery 10 becomes less susceptible to degradation, the life of the battery becomes longer.

Such switching between the operation modes may be adequately conducted according to the utilization pattern of the electric vehicle. For example, the secondary battery 10 may be used in the long life mode on weekdays when the vehicle is used mainly in the neighborhood for shopping, commuting or the like, and may be used in the high capacity mode on a holiday when the vehicle is used for a long drive. In this way, the life of the secondary battery 10 can be extended while making the most of the power thereof as required.

In the above embodiment, the charge condition and the operating temperature controlled by the temperature controller 14 for the respective operation modes were set as shown in the table below.

| Operation Mode | Charge Current | Charge End Voltage | Total Charge Time | Operating Temperature |
| --- | --- | --- | --- | --- |
| High capacity mode | 20 A | 4.2 V | 8 hours | 35° C. ± 20° C. |
| Long life mode | 10 A | 3.9 V | 8 hours | 15° C. ± 20° C. |

Then, assuming the following utilization of the electric vehicle, the secondary battery 10 was repeatedly charged and discharged. That is, the battery was discharged a number of times corresponding to five days of a week supposing the weekdays commuting (total driving range of about 40 km) and was discharged a number of times corresponding to remaining two days of a week supposing the holiday long drive (total driving range of 80 km).

Here, in an operation example 1, charge and discharge supposing weekdays were conducted in the long life mode in which the average operating temperature of the secondary battery 10 was 15° C., and charge and discharge supposing a holiday were conducted in the high capacity mode in which the average operating temperature of the secondary battery 10 was 35° C. Besides, in an operation example 2, except that the average operating temperature of the secondary battery 10 was set at 35° C. for both the modes, charge and discharge were repeated in the same manner as the operation example 1 with the ratio of the long life mode to the high capacity mode being 5 to 2 (corresponding to an operation method as set forth in claim 1 of this invention).

On the other hand, in a comparison operation example 1, charge and discharge were always repeated only in the long life mode in which the quantity of charged electricity of the secondary battery 10 is 60% of a rated capacity for a fresh battery, and in a comparison operation example 2, charge and discharge were repeated only in the high capacity mode in which the quantity of charged electricity of the secondary battery 10 is 100% of a rated capacity for a fresh battery.

Results of the above operations are shown in the table below. Here, a "number of days of possible to drive" refers to a total number of operating days before the vehicle can no longer travel 40 km in a weekday or 80 km in a holiday.

|  | Number of Days of Possible to Drive |
| --- | --- |
| Operation example 1 | 1197 days |
| Operation example 2 | 763 days |
| Comparison operation example 1 | 490 days |
| Comparison operation example 2 | 637 days |

As apparently seen from the above table, the number of days of possible to drive in the operation examples 1 and 2 in this embodiment are 1.6 to 2 times larger than those in the comparison operation examples 1 and 2 corresponding to the conventional operation method for the secondary battery, so that a long-life operation becomes possible. Here, the number of days of possible to drive is smaller in the comparison operation example 1 using only the long life mode than in the comparison operation mode 2 using only the high capacity mode because a fresh battery is charged to a quantity of charged electricity enough for traveling only 90 km (60% of a rated capacity thereof), and thus the driving range of 80 km in a holiday cannot be covered if the battery is degraded.

Second Embodiment

Figure 3:
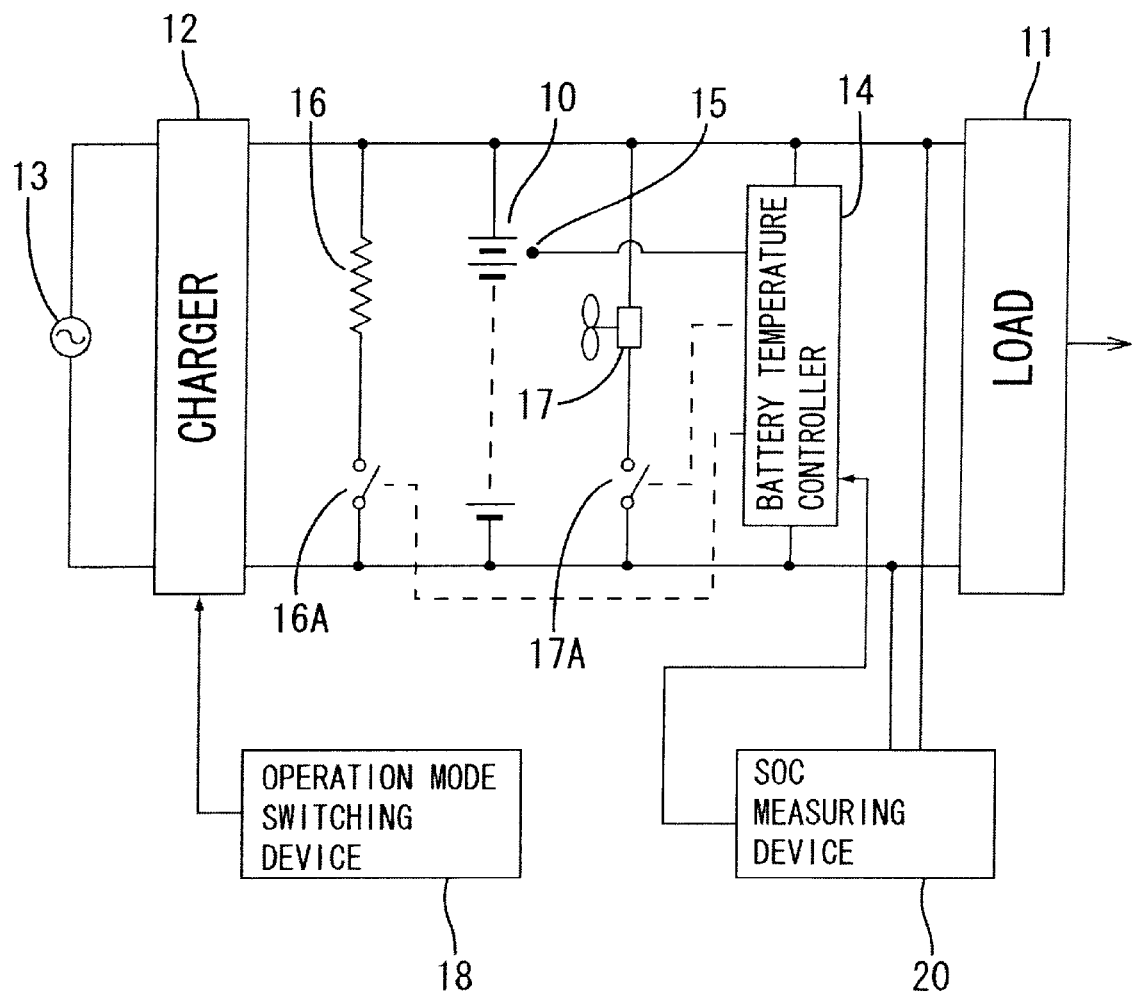
FIG. 3 is a block diagram showing a second embodiment of this invention.

FIG. 3 shows a second embodiment of this invention. A difference between the second and first embodiments is that a SOC measuring device 20 for measuring a state of charge of the secondary battery 10 is provided, and the temperature controller 14 is controlled by the SOC measuring device 20. The rest of the configuration is the same as the first embodiment, so that a same portion as in the first embodiment is assigned the same reference numeral and the description thereof is omitted.

Here, the state of charge (SOC) of the secondary battery 10 indicates a remaining capacity at that time. A state in which the battery is fully charged with the predetermined charge end voltage intended for attaining the rated capacity is defined as a SOC of 100%, and a state in which the battery then discharges electricity corresponding to a half of the rated capacity is defined as a SOC of 50%. The SOC is related with a no-load terminal voltage (open terminal voltage) of the secondary battery 10. Thus, the SOC measuring device 20 in this embodiment determines the SOC by obtaining the open circuit voltage at that time relying on a table or arithmetic equation of the open circuit voltage and the SOC created for the same kind of secondary battery, for example. Then, if the SOC is equal to or higher than 50%, for example, it outputs a signal to the temperature controller 14 for keeping the temperature of the secondary battery 10 relatively low (15° C.±20° C., for example), and if the SOC is lower than 50%, it outputs a signal to the temperature controller 14 for keeping the temperature of the secondary battery 10 higher (35° C.±20° C., for example).

In this embodiment, as in the first embodiment, when the high capacity mode is set by the mode switch in the operation mode setting means 18, the charge end voltage of the secondary battery 10 during charge is set at the higher value of 4.2 V, so that a fresh battery is charged to a level of substantially 100% of a rated capacity thereof. On the other hand, when the mode is switched to the long life mode by the mode switch, the charge end voltage of the secondary battery 10 during charge is set at the lower value of 3.9 V, so that a fresh battery is charged to a level of substantially 60% of a rated capacity thereof, and thus a maximum driving range is shorter than that for the high capacity mode. However, since the secondary battery 10 becomes less susceptible to degradation, the life of the battery becomes longer.

In addition, in either operation mode for charge, during discharge, the temperature of the secondary battery 10 is kept relatively low in the region of the SOC of 50% or higher where the battery is susceptible to degradation. Accordingly, degradation of the battery can be suppressed, and the life thereof can be extended.

Third Embodiment

Figure 4:
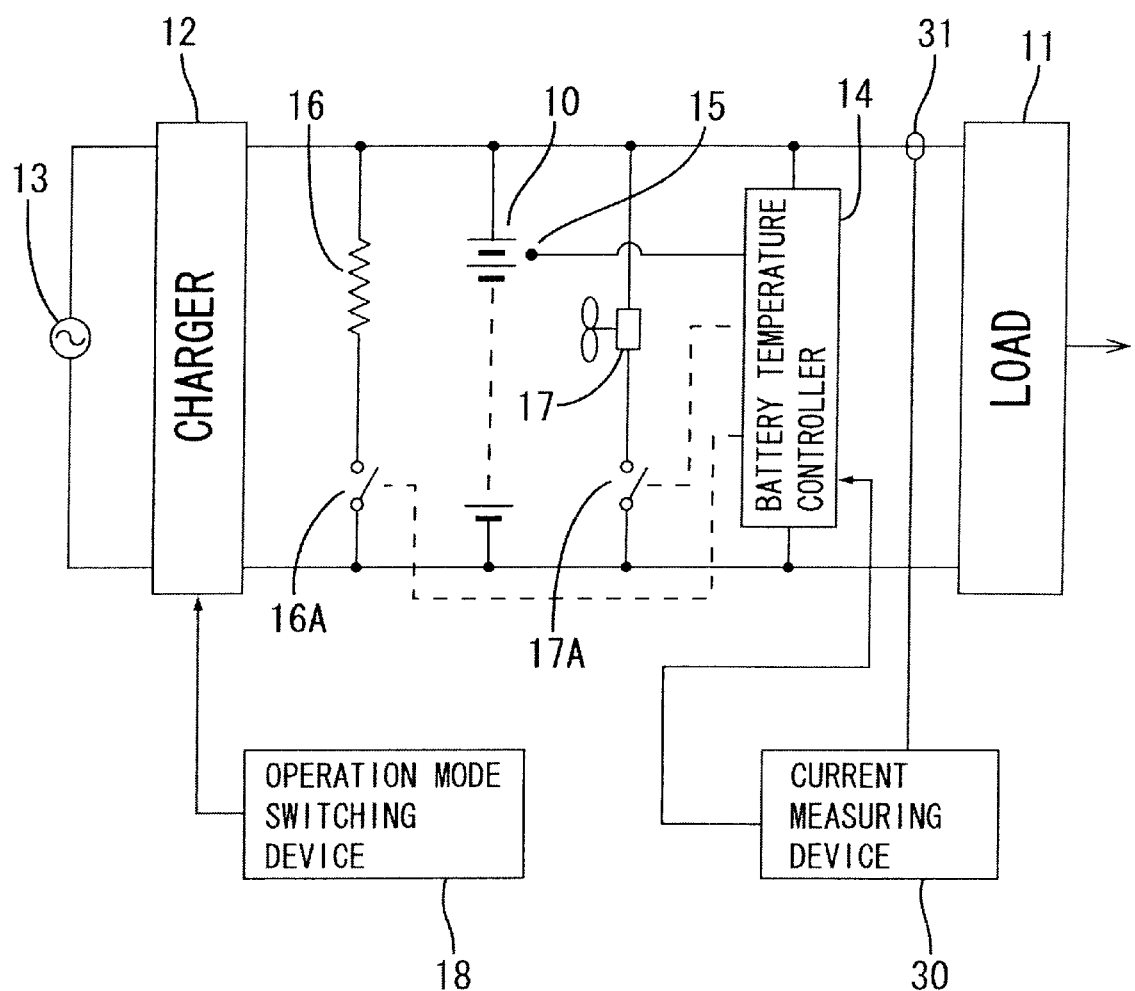
FIG. 4 is a block diagram showing a third embodiment of this invention.

FIG. 4 shows a third embodiment of this invention. A difference between the third and first embodiments is that a current measuring device 30 for measuring a discharge current from the secondary battery 10 is provided, and the temperature controller 14 is controlled by the current measuring device 30. The rest of the configuration is the same as the first embodiment, and a same portion as in the first embodiment is assigned the same reference numeral so that the description thereof is omitted.

The discharge current from the secondary battery 10 is measured by a current sensor 31 provided in a discharge path leading to the load 11, and if the discharge current is equal to or lower than a predetermined value (20% of the rated current, for example), a signal is output to the temperature controller 14 for keeping the temperature of the secondary battery 10 relatively low (15° C.±20° C., for example), and if the discharge current is higher than 20%, a signal is output to the temperature controller 14 for keeping the temperature of the secondary battery 10 higher (35° C.±20° C., for example).

In this embodiment, as in the first embodiment, the high capacity mode and the long life mode can be switched to one another by the mode switch in the operation mode setting means 18. In addition, since the temperature of the secondary battery 10 is kept relatively low if the current during discharge is low, degradation of the battery can be suppressed. Furthermore, since the temperature of the secondary battery 10 is kept relatively high if a large discharge current flows, stored energy can be efficiently released in the form of electric energy, and thus a certain service capacity can be assured.

Fourth Embodiment

Figure 5:
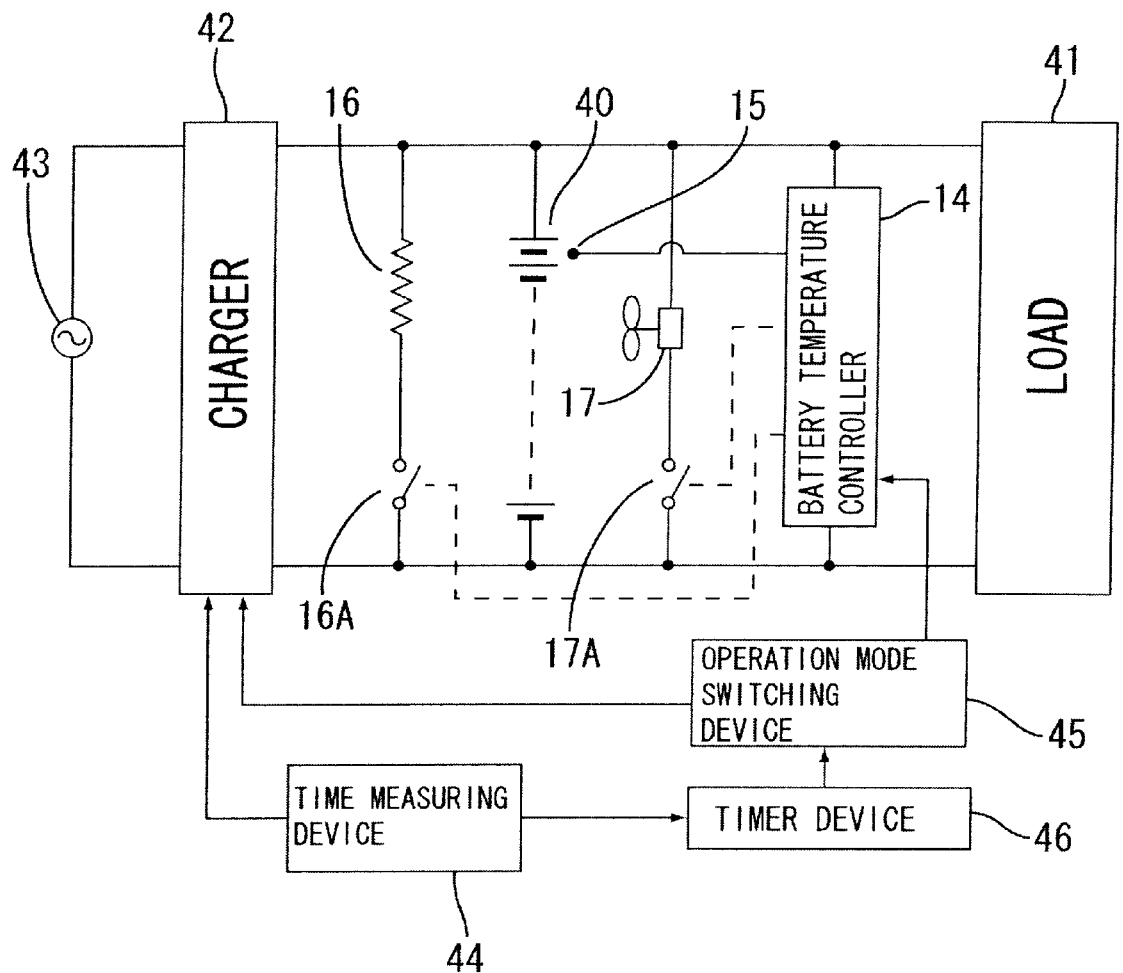
FIG. 5 is a block diagram showing a fourth embodiment of this invention.

Now, a fourth embodiment of this invention applied to a secondary battery for storing midnight electric power in an office building will be described with reference to FIGS. 5 and 6.

Reference numeral 40 denotes a lithium secondary battery, which supplies a DC power to a load 41 composed of an inverter and the like connected to an electric power supply line in the office building. A charger 42 is connected to the secondary battery 40, and thus the secondary battery 40 can be charged with the commercial power supply during the time period of the midnight electric power according to a signal from a time measuring device 44. The charge pattern is the same as that shown in FIG. 2, for example, in which upon beginning of charge, the battery is charged with a predetermined constant current to a predetermined charge end voltage, and then constant voltage charge with the charge end voltage is conducted until a predetermined time T, which is the total charge time, is reached. There are two operation modes of a high capacity mode and a long life mode described later, the charge end voltage for the high capacity mode being set higher than that for the long life mode.

Reference numeral 14 denotes a temperature controller having a function of controlling an operating temperature of the secondary battery 40 based on a signal received from a temperature sensor 15. Since it has the same configuration as that in the first embodiment, a same portion as in the first embodiment is assigned the same reference numeral and the description thereof is omitted.

Reference numeral 45 denotes operation mode setting means, which can transmit a signal to the charger 42 to switch the operation mode thereof between the high capacity mode and the long life mode. For example, in the high capacity mode, the charger 42 has a charge current of 20A during the constant current charge and a charge end voltage of 4.2 V, and in the long life mode, it has a charge current of 10A during the constant current charge and a charge end voltage 3.9 V. That is, the charge end voltage is higher in the high capacity mode than in the long life mode, and the charge current during the constant current charge is larger in the high capacity mode than in the long life mode. Furthermore, according to this embodiment, the operation mode setting means 45 transmits a signal also to the temperature controller 14, an average operating temperature of the secondary battery 40 (during charge and discharge) controlled by the temperature controller 14 is set to fall within the range of 35° C.±20° C. in the high capacity mode, and is set to fall within the range of 15° C.±20° C. in the long life mode.

In addition, the timing of switching the operation mode in the operation mode setting means 45 is controlled by a timer device 46. The timer device 46 obtains time information from the time measuring device 44 and follows a schedule previously established and stored therein. For example, as shown in FIG. 6, the long life mode is adopted from Friday midnight to Sunday evening, and the high capacity mode is adopted during the rest time period (from Sunday midnight to Friday evening).

In the fourth embodiment, according to the schedule established in the timer device 46, the charger 42 charges the secondary battery 40 in the high capacity mode (with the charge end voltage of 4.2 V) on weekdays, and is controlled by the temperature controller 14 to attain the average temperature falling within the range of 35° C.±20° C. during operation. As a result, a fresh battery is charged to a level of substantially 100% of a rated capacity thereof, and when the lithium secondary battery 40 having a capacity of 100 Ah is used, electric power for about six hours during the daytime on weekdays in a typical office building can be supplied.

Furthermore, the long life mode is automatically set during the period from Friday midnight to Sunday evening.

In this case, the charge end voltage of the secondary battery 40 during charge is set at the lower value of 3.9 V, and the average temperature thereof during operation is set to fall within the range of 15° C.±20° C. Accordingly, a fresh secondary battery 40 is charged to a level of substantially 60% of a rated capacity thereof, and thus degradation of the secondary battery 40 is suppressed. In such a case, since the electric power consumption of the office building is reduced on a holiday, electric power for about six hours on a holiday can be supplied, so that there is no problem practically.

In this embodiment, the charge condition and the operating temperature controlled by the temperature controller 14 for the respective operation modes were set as shown in the table below.

| Operation Mode | Charge Current | Charge End Voltage | Total Charge Time | Operating Temperature |
|---|---|---|---|---|
| High capacity mode | 20 A | 4.2 V | 8 hours | 35° C. ± 20° C. |
| Long life mode | 10 A | 3.9 V | 8 hours | 15° C. ± 20° C. |

Then, assuming the following electric power demand in the office building, the secondary battery 40 was repeatedly charged and discharged. That is, the battery discharged electricity corresponding to the weekdays electric power consumption (50 Ah) a number of times corresponding to five days in a week, and discharged electricity corresponding to the holiday electric power consumption (25 Ah) a number of times corresponding to remaining two days in a week.

Here, in an operation example 3, the high capacity mode was adopted on weekdays in which the quantity of charged electricity of the secondary battery 40 is 100% of a rated capacity thereof (100 Ah) if the battery is fresh and the average operating temperature thereof is 35° C., and the long life mode was adopted on a holiday in which the quantity of charged electricity of the secondary battery 40 is 60% of a rated capacity thereof (60 Ah) if the battery is fresh and the average operating temperature thereof being 15° C.

On the other hand, in a comparison operation example 3, charge and discharge were repeated only in the long life mode (as above), and in a comparison operation example 4, charge and discharge were repeated only in the high capacity mode (as above).

Results of the above operations are shown in the table below. Here, a "number of days of power available" refers to a total number of days of power available before discharge of 50 Ah becomes impossible on a weekday, or discharge of 25 Ah becomes impossible on a holiday.

| | | Battery Capacity | |
|---|---|---|---|
| | Number of Days of Power Available | Beginning of life | End of life |
| Operation example 3 | 1964 days | 100 Ah (weekday) | 50 Ah (weekday) |
| Comparison operation example 3 | 680 days | 60 Ah | 50 Ah |
| Comparison operation example 4 | 927 days | 100 Ah | 50 Ah |

As apparently seen from the above table, the number of days of power available of the secondary battery 40 in the operation example 3 is 2 or more times larger than that in the comparison operation examples 3 and 4 corresponding to the conventional operation method for the secondary battery, so that a long-life operation becomes possible.

Fifth Embodiment

Figure 7:
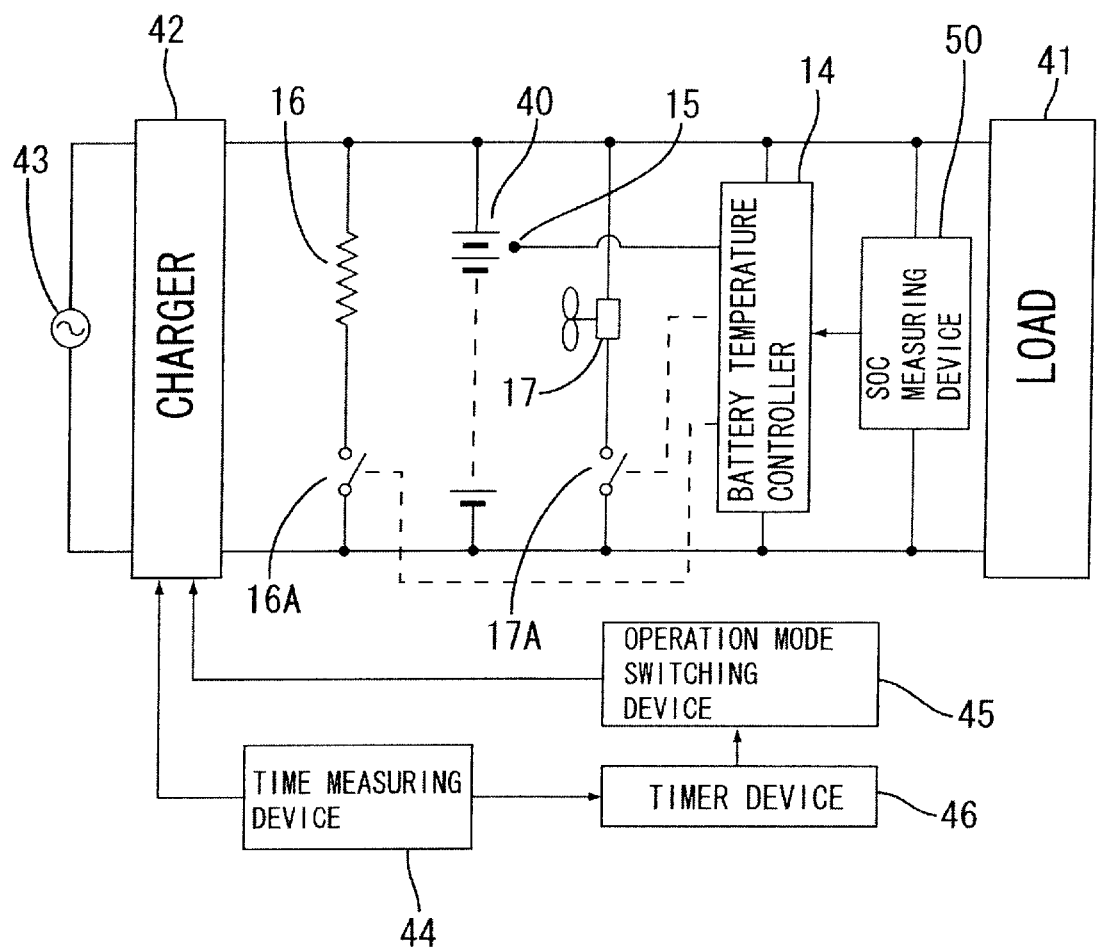
FIG. 7 is a block diagram showing a fifth embodiment of this invention.

FIG. 7 shows a fifth embodiment of this invention. A difference between the fifth and fourth embodiments is that a SOC measuring device 50 is added thereto, and the temperature controller 14 is controlled by the SOC measuring device 50 rather than the operation mode setting means 45. The rest of the configuration is the same as the fourth embodiment, so that a same portion as in the fourth embodiment is assigned the same reference numeral and the description thereof is omitted.

The SOC measuring device 50 determines the state of charge based on the open circuit voltage of the secondary battery 40. If the SOC is equal to or higher than 50%, for example, it outputs a signal to the temperature controller 14 for keeping the temperature of the secondary battery 40 relatively low (15° C.±20° C., for example), and if the SOC is lower than 50%, it outputs a signal to the temperature controller 14 for keeping the temperature of the secondary battery 40 higher (35° C.±20° C., for example).

In this embodiment, as in the fourth embodiment, according to the schedule established in the timer device 46, the charger 42 charges the secondary battery 40 in the high capacity mode with the charge end voltage of 4.2 V on weekdays, so that a fresh battery is charged to a level of substantially 100% of a rated capacity thereof. Furthermore, the long life mode is automatically set during the period from Friday midnight to Sunday evening. In this case, the charge end voltage of the secondary battery 40 during charge is set at the lower value of 3.9 V, so that a fresh secondary battery 40 is charged to a level of substantially 60% of a rated capacity thereof, and thus degradation of the secondary battery 40 is suppressed. In addition, in either operation mode for charge, during discharge, the temperature of the secondary battery 40 is kept relatively low (15° C.±20° C.) in the region of the state of charge of 50% or higher where the battery is susceptible to degradation. Accordingly, degradation of the battery can be suppressed, and the life thereof can be extended further.

Sixth Embodiment

Figure 8:
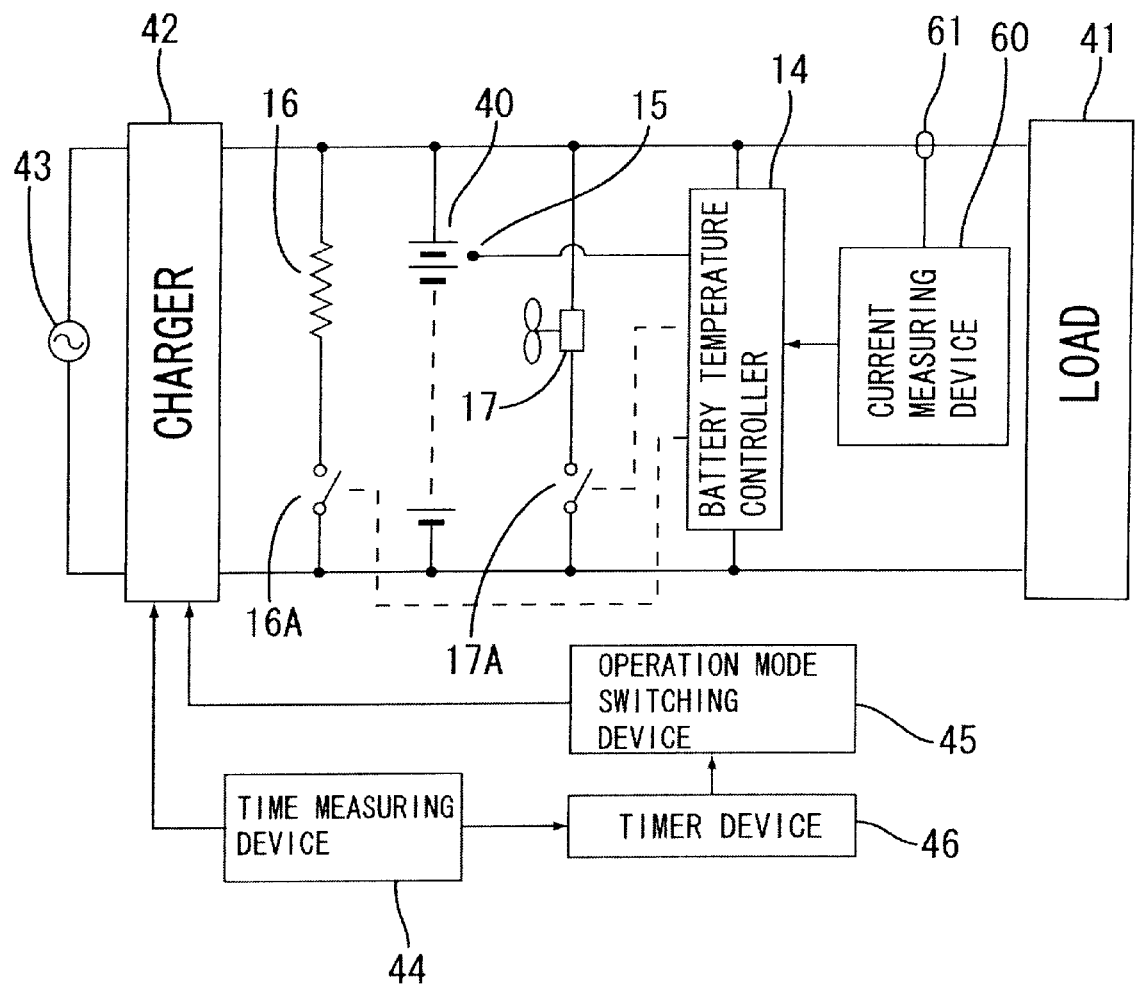
FIG. 8 is a block diagram showing a sixth embodiment of this invention.

FIG. 8 shows a sixth embodiment of this invention. A difference between the sixth and fifth embodiments is that the SOC measuring device 50 is replaced with a current measuring device 60 for measuring a discharge current from the secondary battery 40, and the temperature controller 14 is controlled by the current measuring device 60. The rest of the configuration is the same as the fifth embodiment, and a same portion as in the fifth embodiment is assigned the same reference numeral so that the description thereof is omitted.

The discharge current from the secondary battery 40 is measured by a current sensor 61 provided in a discharge path leading to the load 41, and if the discharge current is equal to or lower than a predetermined value (20% of the rated current, for example), a signal is output to the temperature controller 14 for keeping the temperature of the secondary battery 40 relatively low (15° C.±20° C., for example), and if the discharge current is higher than 20%, a signal is output to the temperature controller 14 for keeping the temperature of the secondary battery 40 higher (35° C.±20° C., for example).

In this embodiment, as in the fifth embodiment, according to the schedule established in the timer device 46, the charger 42 charges the secondary battery 40 in the high capacity mode on weekdays, and in the long life mode from Friday midnight to Sunday evening. In addition, since the temperature of the secondary battery 40 is kept relatively low if the current during discharge is low, degradation of the battery can be suppressed. Furthermore, since the temperature of the secondary battery 40 is kept relatively high if a large discharge current flows, stored energy can be efficiently released in the form of electric energy, and thus a certain service capacity can be assured.

Seventh Embodiment

Figure 9:
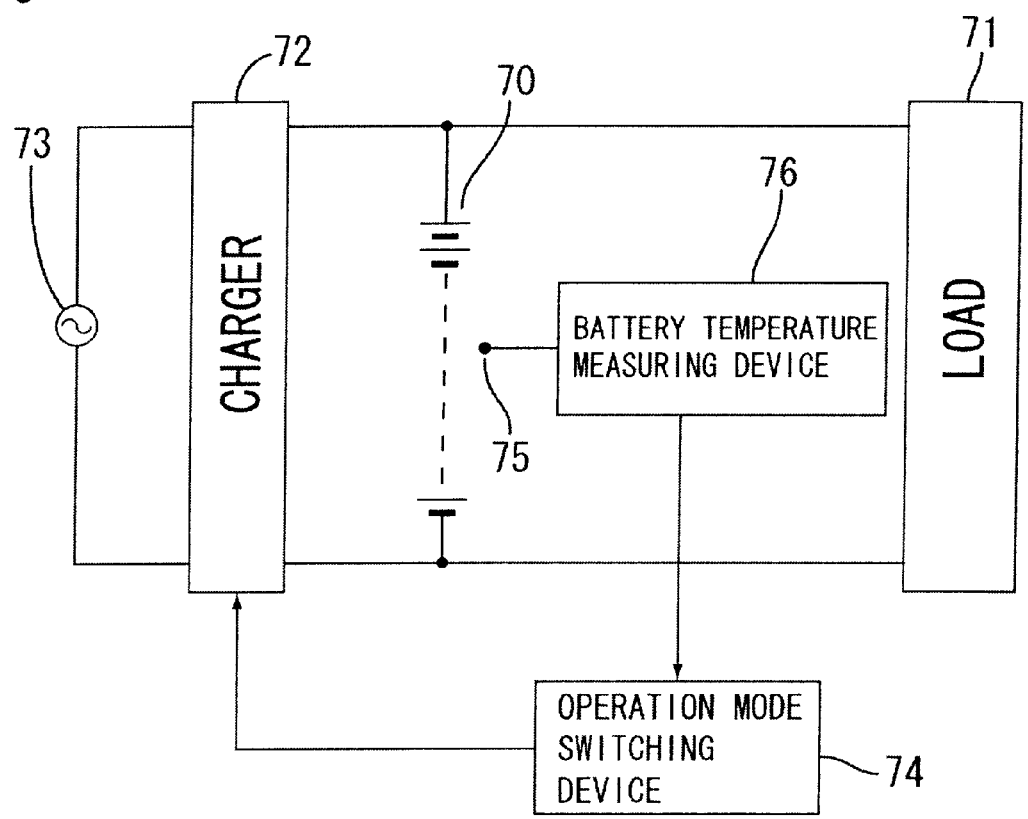
FIG. 9 is a block diagram showing a seventh embodiment of this invention.

FIG. 9 shows a seventh embodiment of this invention. Reference numeral 70 denotes a lithium secondary battery, which supplies a DC power to a load 71 composed of an inverter and the like for driving an electric vehicle. A charger 72 is connected to the secondary battery 70, and thus the secondary battery 70 can be charged with an alternating current power supplied from a commercial power supply 73. The charge pattern is arranged so that upon beginning of charge, the battery is charged with a predetermined constant current to a predetermined charge end voltage, and then constant voltage charge with the charge end voltage is conducted until a predetermined time T, which is the total charge time, is reached. There are three operation modes differing from each other in charge end voltage.

These operation modes are switched to each other according to a signal received from operation mode setting means 74. For example, in the high capacity mode corresponding to a first operation mode, the charge end voltage is set at 4.2 V, and in the long life mode corresponding to a second operation mode, the charge end voltage is set at 3.85 V. In addition, there is provided an intermediate mode as a third operation mode, in which the charge end voltage is set at 3.95 V, for example.

A temperature sensor 75 is provided near the secondary battery 70, and by means of a signal from the sensor, the temperature measuring device 76 measures the temperature of the secondary battery 70 and transmits a signal associated with the temperature to the operation mode setting means 74. The operation mode setting means 74 comprises a storage circuit storing a table of the temperature and the modes associated with each other as shown below, and determines the operation mode according to the temperature.

| Temperature of Secondary Battery 70 | Operation Mode | Charge End Voltage |
| --- | --- | --- |
| −20° C.–10° C. | Intermediate mode | 3.95 V |
| 10° C.–35° C. | High capacity mode | 4.20 V |
| Higher than 35° C. | Long life mode | 3.85 V |

In this embodiment, since charge is conducted in the high capacity mode in a normal temperature range (10° C. to 35° C.), a long drive is possible making the most of the capability of the secondary battery 70. In the high temperature range higher than 35° C., since the secondary battery 70 is charged in the long life mode, degradation of the secondary battery 70 can be minimized. Beside, in the low temperature range between −20° C. and 10° C., since electrochemical activity of a negative electrode is low, in the case of high utilization factor, metallic lithium is readily deposited, so that performance of the battery is readily degraded. However, according to this embodiment, the battery is charged in the intermediate mode with the charge end voltage of 3.95 V, so that the utilization factor of the negative electrode can be lowered, and degradation of the battery performance can be minimized.

Eighth Embodiment

Figure 10:
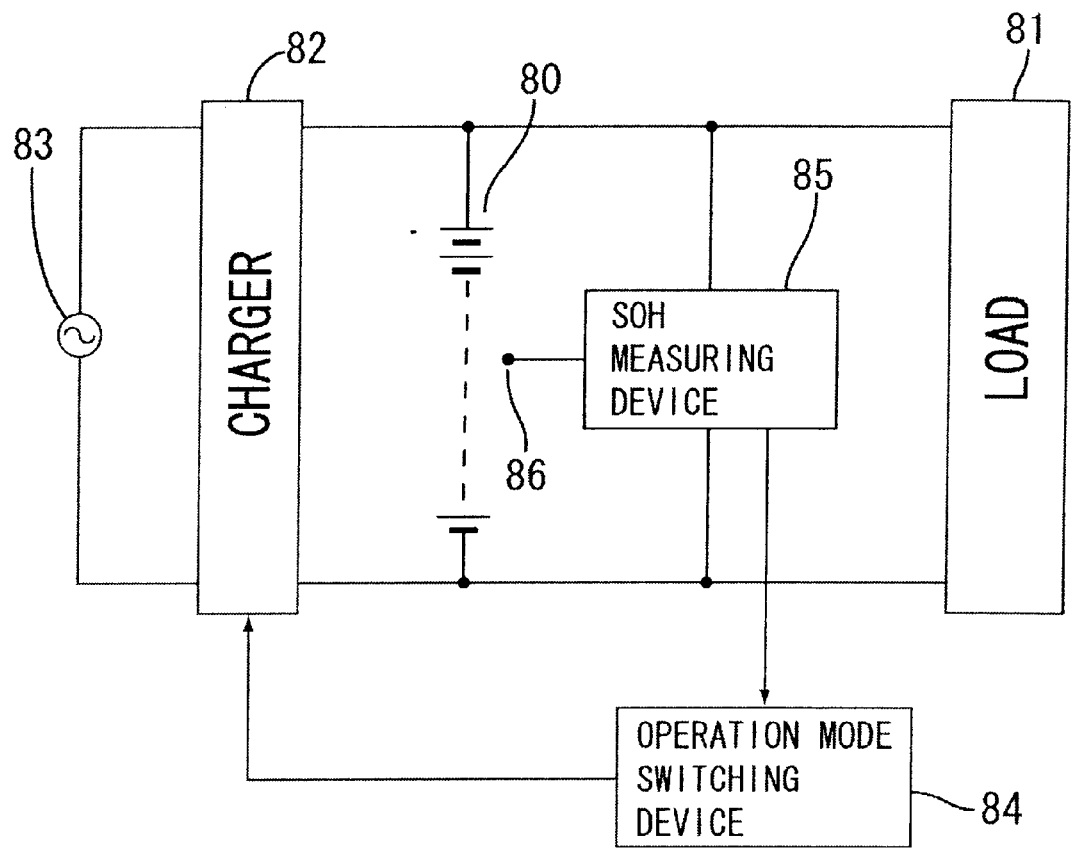
FIG. 10 is a block diagram showing an eighth embodiment of this invention.

FIG. 10 shows an eighth embodiment of this invention. Reference numeral 80 denotes a lithium secondary battery having a capacity of 100 Ah, for example, which supplies a DC power to a load 81 composed of an inverter and the like for driving an electric vehicle. A charger 82 is connected to the secondary battery 80, and thus the secondary battery 80 can be charged with an alternating current power supplied from a commercial power supply 83. The charge pattern is arranged so that upon beginning of charge, the battery is charged with a predetermined constant current to a predetermined charge end voltage, and then constant voltage charge with the charge end voltage is conducted until a predetermined time T, which is the total charge time, is reached. There are two operation modes differing from each other in charge end voltage.

These operation modes are switched to each other according to a signal received from operation mode setting means 84. For example, in the high capacity mode corresponding to a first operation mode, the charge end voltage is set at 4.2 V, and in the long life mode corresponding to a second operation mode, the charge end voltage is set at 3.9 V.

Reference numeral 85 denotes a SOH measuring device for measuring a SOH (State of Health) of the secondary battery 80. In general, as the state of health of the battery is reduced, an internal resistance thereof is increased, so that the state of health of the battery can be determined from a table of a voltage drop value when the battery is discharged and a temperature of the battery. An example of the table of the state of health used in this embodiment is shown below, and the table is stored in the storage in the SOH measuring device 85. Here, the voltage drop value indicates a value (in the unit V) attained after the secondary battery 80 is discharged at the level of 100A for three minutes, the SOH of 100% refers to a state in which the secondary battery 80 is a fresh one and has a rated capacity thereof, and the SOH of 0% refers to a state in which the secondary battery 80 is degraded and the service capacity thereof is reduced to the lowest level required for the load.

| Temperature | SOH (%) | | | | |
| --- | --- | --- | --- | --- | --- |
| (° C.) | 100 | 75 | 50 | 25 | 0 |
| −10 | 0.91 | 1.43 | 1.88 | 2.29 | 2.73 |
| 0 | 0.46 | 0.72 | 0.97 | 1.21 | 1.38 |
| 10 | 0.27 | 0.39 | 0.58 | 0.74 | 0.81 |
| 20 | 0.22 | 0.33 | 0.47 | 0.59 | 0.66 |
| 30 | 0.17 | 0.26 | 0.35 | 0.43 | 0.51 |

The SOH measuring device 85 detects the temperature of the secondary battery 80 according to the signal from the temperature sensor 85, detects the voltage drop value by performing a discharge test on the secondary battery 80, and determines the SOH according to the above table using these values. Then, the SOH measuring device transmits a signal to the operation mode setting means 84 to let the charger 82 operate in the long life mode until the SOH is reduced to 25%, for example, and to let the charger 82 operate in the high capacity mode when the SOH is equal to or lower than 25%.

According to this embodiment, since charge is conducted in the long life mode when degradation of the secondary battery 80 is not advanced and the state of health falls within the range from 100% to 25%, the advance of the degradation can be suppressed to the utmost. Besides, in a state where the state of health is equal to or lower than 25%, charge is conducted in the high capacity mode, that maximizes the capability of the battery which capacity is degrading.

Here, in the case where the operation mode of the charger 82 is switched based on the SOH as in this embodiment, the temperature controller 14 may be provided as in the first embodiment to keep the temperature of the secondary battery 80 low in the long life mode and high in the high capacity mode. Besides, the SOC measuring device 20 may be provided as in the second embodiment to keep the temperature of the secondary battery 80 low when the SOC is high and high when the SOC is low. Besides, the current measuring device 30 may be provided as in the third embodiment to keep the operating temperature low when the discharge current is low and high when the discharge current is high.

Ninth Embodiment

Figure 11:
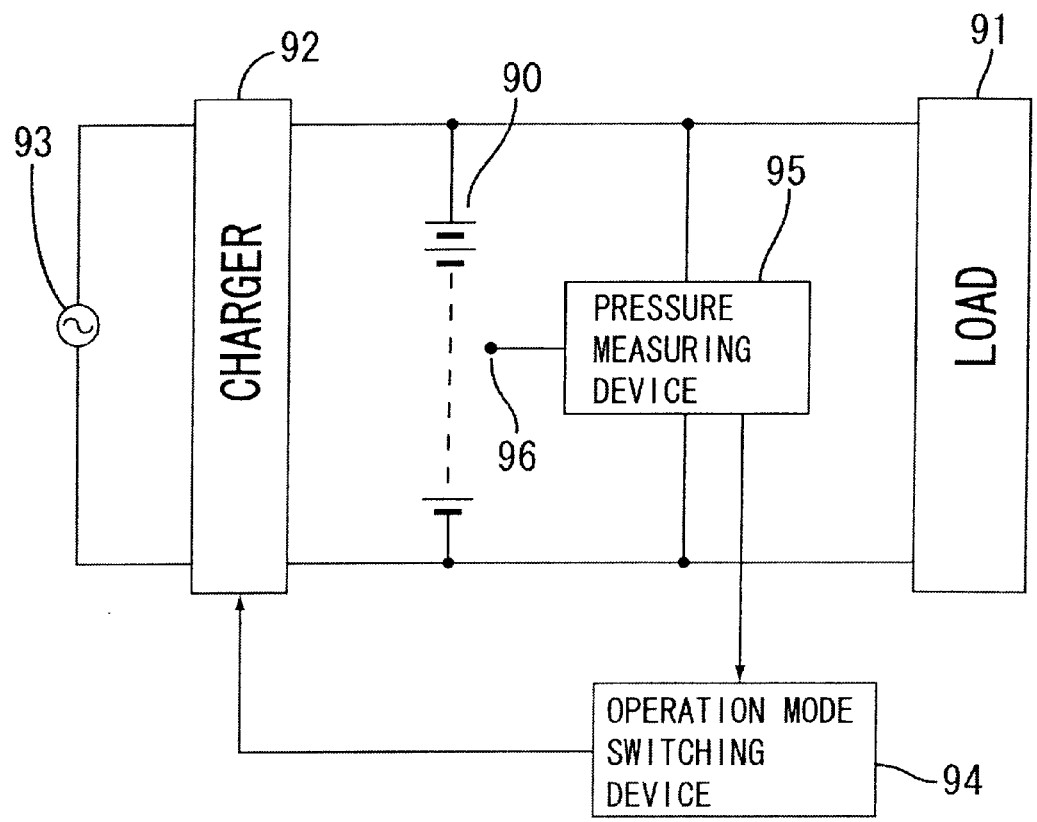
FIG. 11 is a block diagram showing a ninth embodiment of this invention.

FIG. 11 shows a ninth embodiment of this invention. Reference numeral 90 denotes a lithium secondary battery, which supplies a DC power to a load 91 composed of an inverter and the like for driving an electric vehicle. A charger 92 is connected to the secondary battery 90, and thus the secondary battery 90 can be charged with an alternating current power supplied from a commercial power supply 93. The charge pattern is arranged so that upon beginning of charge, the battery is charged with a predetermined constant current to a predetermined charge end voltage, and then constant voltage charge with the charge end voltage is conducted until a predetermined time T, which is the total charge time, is reached. There are two operation modes differing from each other in charge end voltage.

These operation modes are switched to each other according to a signal received from an operation mode setting means 94. For example, in the high capacity mode corresponding to a first operation mode, the charge end voltage is set at 4.2 V, and in the long life mode corresponding to a second operation mode, the charge end voltage is set at 3.9 V.

Reference numeral 95 denotes a pressure measuring device for measuring an internal pressure of the secondary battery 90. In general, as the degradation of the battery is advanced, the internal pressure thereof is increased, so that the degree of the degradation can be found from the variation of the internal pressure. While the internal pressure is detected with a pressure sensor 96 attached to a battery case (not shown) in this embodiment, it may also be detected with a strain gage attached to a surface of the battery case. In this embodiment, the internal pressure of the secondary battery 90 was 0.1 MPa when the battery was fresh, 0.2 MPa when the state of health was on the order of 50%, 0.25 MPa when the state of health was 25%, and 0.3 MPa at the end of the life thereof.

The pressure measuring device 95 detects the internal pressure of the secondary battery 90 according to a signal from the pressure sensor 96, and transmits a signal to the operation mode setting means 94 to let the charger 92 operate in the long life mode until the pressure reaches 0.25 MPa, for example, and to let the charger 92 operate in the high capacity mode when the pressure is equal to or higher than 0.25 MPa.

According to this embodiment, since charge is conducted in the long life mode when degradation of the secondary battery 90 is not advanced, the advance of the degradation can be suppressed to the utmost. Besides, in a state where the internal pressure is equal to or higher than 0.25 MPa (the state of health is equal to or lower than 25%), charge is conducted in the high capacity mode, that maximizes the capability of the battery which capacity is degrading.

Here, also in the case where the operation mode of the charger 92 is switched based on the internal pressure as in this embodiment, the temperature controller 14 may be provided as in the first embodiment to keep the temperature of the secondary battery 90 low in the long life mode and high in the high capacity mode. Besides, the SOC measuring device 20 may be provided as in the second embodiment to keep the temperature of the secondary battery 90 low when the SOC is high and high when the SOC is low. Besides, the current measuring device 30 may be provided as in the third embodiment to keep the operating temperature low when the discharge current is low and high when the discharge current is high.

The present invention is not limited to the embodiments explained in the above description with reference to the drawings, and the following embodiments are included in the scope of this invention. And besides the following embodiments, this invention can be modified without departing from the spirit thereof.

(1) While in the above embodiments, this invention is applied to the secondary battery for driving an electric vehicle and for load-leveling, this invention is not limited thereto and can be applied to portable electronic equipment including a notebook personal computer, a PDA and a cellular phone, a household electrical appliance including a cordless telephone and a cordless cleaner, and all other equipment that is supplied from the secondary battery.

(2) While in the above embodiments, two charge modes of the high capacity mode and the long life mode are provided, three or more charge modes may be established, of course. In addition, many operation modes may be established in a stepless manner so that these modes are continuously switched to each other.

(3) In the above embodiments, two charge modes of the high capacity mode and the long life mode are provided, and the operation modes are switched to each other according to a manual, calendar schedule, temperature, state of health, or internal pressure. Besides, the temperature control of the battery is switched according to the operation mode, state of charge, or discharge current value. However, this invention is not limited thereto, and many operation modes may be established, and an adequate operation mode may be determined and selected by a personal computer or the like according to one or more selected from a group of a manual, calendar schedule, temperature, state of health, internal pressure and the like.

What is claimed is:

1. An operation method for a secondary battery, in which charge operation and discharge operation are repeated, wherein said charge operation has at least two operation modes including first and second operation modes in which said secondary battery is charged to predetermined charge end voltages different from each other, and either of the two operation modes can be selected according to a control signal from the outside of said secondary battery.

2. The operation method for a secondary battery according to claim 1, wherein the charge end voltage in said first operation mode is set higher than the charge end voltage in said second operation mode, and a temperature during charge and discharge operations in said first operation mode is set higher than a temperature during charge and discharge operations in said second operation mode.

3. An operation method for a secondary battery, in which charge operation and discharge operation are repeated, wherein said charge operation has at least two operation modes including first and second operation modes in which said secondary battery is charged to predetermined charge end voltages different from each other, and the two operation modes are switched to each other according to a preset schedule.

4. The operation method for a secondary battery according to claim 3, wherein the charge end voltage in said first operation mode is set higher than the charge end voltage in said second operation mode, and a temperature during charge and discharge operations in said first operation mode is set higher than a temperature during charge and discharge operations in said second operation mode.

5. A secondary battery device, comprising:
   a secondary battery capable of being charged and discharged;
   a charger for charging the secondary battery, the charger operating in first and second operation modes in which said secondary battery is charged to predetermined charge end voltages different from each other, and the charge end voltage in said first operation mode being set higher than the charge end voltage in said second operation mode; and
   an operation mode switching device allowing the operation modes of said charger to be switched.

6. The secondary battery device according to claim 5, further comprising a battery temperature controlling device for controlling an operating temperature of said secondary battery, wherein the battery temperature controlling device controls the battery temperature during charge and discharge operations in the first operation mode so as to be higher than the temperature in the second operation mode.

7. The secondary battery device according to claim 5, further comprising:
   a SOC measuring device for detecting a state of charge of said secondary battery; and
   a battery temperature controlling device for controlling an operating temperature of said secondary battery, wherein when said SOC measuring device detects a state of charge equal to or higher than a predetermined value, the battery temperature controlling device controls the temperature of said secondary battery during charge and discharge operations to be low.

8. The secondary battery device according to claim 5, further comprising:
   a current measuring device for measuring a discharge current from said secondary battery; and
   a battery temperature controlling device for controlling and operating temperature of said secondary battery, wherein when said current measuring device detects a discharge current equal to or lower than a predetermined value, the battery temperature controlling device controls the temperature of said secondary battery during charge and discharge operations to be low.

9. The secondary battery device according to claim 5, further comprising a battery temperature measuring device for detecting a temperature of said secondary battery, wherein when the temperature measuring device detects a battery temperature equal to or higher than a predetermined value, a signal is transmitted to said operation mode switching device to let said charger operate in the second operation mode.

10. The secondary battery device according to claim 5, further comprising a SOH measuring device for measuring a state of health of said secondary battery, wherein when the SOH measuring device detects a SOH of said secondary battery equal to or lower than a predetermined value, a signal is transmitted to said operation mode switching device to let said secondary battery operate in said first operation mode.

11. The secondary battery device according to claim 10, further comprising a battery temperature controlling device for controlling an operating temperature of said secondary battery, wherein the battery temperature controlling device controls the battery temperature during charge and discharge operations in the first operation mode so as to be higher than the temperature in the second operation mode.

12. The secondary battery device according to claim 10, further comprising: a SOC measuring device for detecting a state of charge of said secondary battery; and
   a battery temperature controlling device for controlling an operating temperature of said secondary battery, wherein when said SOC measuring device detects a state of charge equal to or higher than a predetermined value, the battery temperature controlling device controls the temperature of said secondary battery during charge and discharge operations to be low.

13. The secondary battery device according to claim 10, further comprising:
   a current measuring device for measuring a discharge current from said secondary battery; and
   a battery temperature controlling device for controlling and operating temperature of said secondary battery, wherein when said current measuring device detects a discharge current equal to or lower than a predetermined value, the battery temperature controlling device controls the temperature of said secondary battery during charge and discharge operations to be low.

14. The secondary battery device according to claim 5, further comprising a pressure measuring device for measuring an internal pressure of said secondary battery, wherein when the pressure measuring device detects an internal pressure of said secondary battery equal to or higher than a predetermined value, a signal is transmitted to said operation mode switching device to let said secondary battery operate in said first operation mode.

15. The secondary battery device according to claim 14, further comprising a battery temperature controlling device for controlling an operating temperature of said secondary battery, wherein the battery temperature controlling device controls the battery temperature during charge and discharge operations in the first operation mode so as to be higher than the temperature in the second operation mode.

16. The secondary battery device according to claim 14, further comprising:
   a SOC measuring device for detecting a state of charge of said secondary battery; and
   a battery temperature controlling device for controlling an operating temperature of said secondary battery, wherein when said SOC measuring device detects a state of charge equal to or higher than a predetermined value, the battery temperature controlling device controls the temperature of said secondary battery during charge and discharge operations to be low.

17. The secondary battery device according to claim 14, further comprising:
   a current measuring device for measuring a discharge current from said secondary battery; and
   a battery temperature controlling device for controlling and operating temperature of said secondary battery, wherein when said current measuring device detects a discharge current equal to or lower than a predetermined value, the battery temperature controlling device controls the temperature of said secondary battery during charge and discharge operations to be low.

18. A secondary battery device, comprising:
- a secondary battery capable of being charged and discharged;
- a charger for charging the secondary battery, the charger operating in first and second operation modes in which said secondary battery is charged to predetermined charge end voltages different from each other, and the charge end voltage in said first operation mode being set higher than the charge end voltage in said second operation mode;
- a time measuring device; and
- a timer device for switching the operation modes of said charger based on a time acquired from the time measuring device and a schedule previously stored.

19. The secondary battery device according to claim 18, further comprising a battery temperature controlling device for controlling an operating temperature of said secondary battery, wherein the battery temperature controlling device controls the battery temperature during charge and discharge operations in the first operation mode so as to be higher than the temperature in the second operation mode.

20. The secondary battery device according to claim 18, further comprising:
- a SOC measuring device for detecting a state of charge of said secondary battery; and
- a battery temperature controlling device for controlling an operating temperature of said secondary battery, wherein when said SOC measuring device detects a state of charge equal to or higher than a predetermined value, the battery temperature controlling device controls the temperature of said secondary battery during charge and discharge operations to be low.

21. The secondary battery device according to claim 18, further comprising:
- a current measuring device for measuring a discharge current from said secondary battery; and
- a battery temperature controlling device for controlling an operating temperature of said secondary battery, wherein when said current measuring device detects a discharge current equal to or lower than a predetermined value, the battery temperature controlling device controls the temperature of said secondary battery during charge and discharge operations to be low.

* * * * *